US012591188B2

(12) United States Patent
Ohkubo

(10) Patent No.: US 12,591,188 B2
(45) Date of Patent: Mar. 31, 2026

(54) DEVELOPING DEVICE INCLUDING SEAL AND IMAGE FORMING APPARATUS

(71) Applicant: Yasuhide Ohkubo, Kanagawa (JP)

(72) Inventor: Yasuhide Ohkubo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/921,402

(22) Filed: Oct. 21, 2024

(65) Prior Publication Data

US 2025/0164906 A1 May 22, 2025

(30) Foreign Application Priority Data

Nov. 22, 2023 (JP) ................................ 2023-198475

(51) Int. Cl.
*G03G 15/08* (2006.01)
*G03G 15/01* (2006.01)

(52) U.S. Cl.
CPC ..... *G03G 15/0817* (2013.01); *G03G 15/0121* (2013.01); *G03G 15/0812* (2013.01); *G03G 15/0881* (2013.01); *G03G 15/0896* (2013.01); *G03G 2215/0802* (2013.01); *G03G 2215/0805* (2013.01); *G03G 2215/0872* (2013.01)

(58) Field of Classification Search
CPC ........... G03G 15/0121; G03G 15/0812; G03G 15/0817; G03G 15/0881; G03G 15/0896; G03G 2215/0802; G03G 2215/0805; G03G 2215/0872
See application file for complete search history.

(56) References Cited

U.S. PATENT DOCUMENTS

2007/0264042 A1* 11/2007 Mori .................. G03G 15/0817 399/106
2013/0129378 A1* 5/2013 Hoshi ................ G03G 21/0029 399/106
2014/0140722 A1 5/2014 Ohkubo et al.
2014/0153958 A1 6/2014 Ogata et al.
2020/0174399 A1 6/2020 Ohkubo et al.
2022/0155707 A1 5/2022 Ohkubo

FOREIGN PATENT DOCUMENTS

JP 2014-112140 A 6/2014
JP 2014-174206 A 9/2014

* cited by examiner

*Primary Examiner* — Joseph S Wong
(74) *Attorney, Agent, or Firm* — Harness, Dickey & Pierce, P.L.C.

(57) ABSTRACT

A developing device includes: a toner bearer; a layer-thickness regulating member including a regulating portion and a projecting portion; a seal holding surface; and a seal. The regulating portion presses against a surface of the toner bearer to regulate a layer thickness of toner on the toner bearer. The projecting portion is at a back side of the regulating portion. The seal holding surface is opposite an end surface of the toner bearer. The seal is between the end surface of the toner bearer and the seal holding surface. A part of the projecting portion opposite the end surface is interposed between the seal and the end surface. The seal holding surface has a convex portion at a position opposite at least one of an upstream adjacent portion or a downstream adjacent portion adjacent to the part of the projecting portion in a surface movement direction of the toner bearer.

9 Claims, 8 Drawing Sheets

DEVELOPING DEVICE INCLUDING SEAL AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-198475, filed on Nov. 22, 2023, in the Japan Patent Office, the entire disclosure of which is hereby incorporated by reference herein.

BACKGROUND

Technical Field

Embodiments of the present disclosure relate to a developing device and an image forming apparatus incorporating the developing device.

Related Art

A developing device is known that includes a toner bearer, a layer-thickness regulating member, and a seal. The layer-thickness regulating member regulates the layer thickness of toner on a surface of the toner bearer at a regulating portion pressed against the surface of the toner bearer. The seal is disposed between an end surface of the toner bearer and a seal holding surface opposite the end surface of the toner bearer.

SUMMARY

In an embodiment of the present disclosure, a developing device includes a toner bearer, a layer-thickness regulating member, a seal holding surface, and a seal. The layer-thickness regulating member includes a regulating portion and a projecting portion. The regulating portion presses against a surface of the toner bearer to regulate a layer thickness of toner on the toner bearer. The projecting portion is at a back side of the regulating portion. The seal holding surface is opposite an end surface of the toner bearer. The seal is between the end surface of the toner bearer and the seal holding surface. A part of the projecting portion opposite the end surface of the toner bearer is interposed between the seal and the end surface of the toner bearer. The seal holding surface has a convex portion at a position opposite at least one of an upstream adjacent portion or a downstream adjacent portion adjacent to the part of the projecting portion in a surface movement direction of the toner bearer.

In another embodiment of the present disclosure, a developing device includes a toner bearer, a layer-thickness regulating member, a seal holding surface, and a seal. The layer-thickness regulating member includes a regulating portion and a projecting portion. The regulating portion presses against a surface of the toner bearer to regulate a layer thickness of toner on the toner bearer. The projecting portion is at a back side of the regulating portion. The seal holding surface is opposite an end surface of the toner bearer. The seal is between the end surface of the toner bearer and the seal holding surface. A part of the projecting portion opposite the end surface of the toner bearer is interposed between the seal and the end surface of the toner bearer. The seal holding surface has a recess at a position opposite the projecting portion.

In still another embodiment of the present disclosure, an image forming apparatus includes a latent image bearer and the developing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
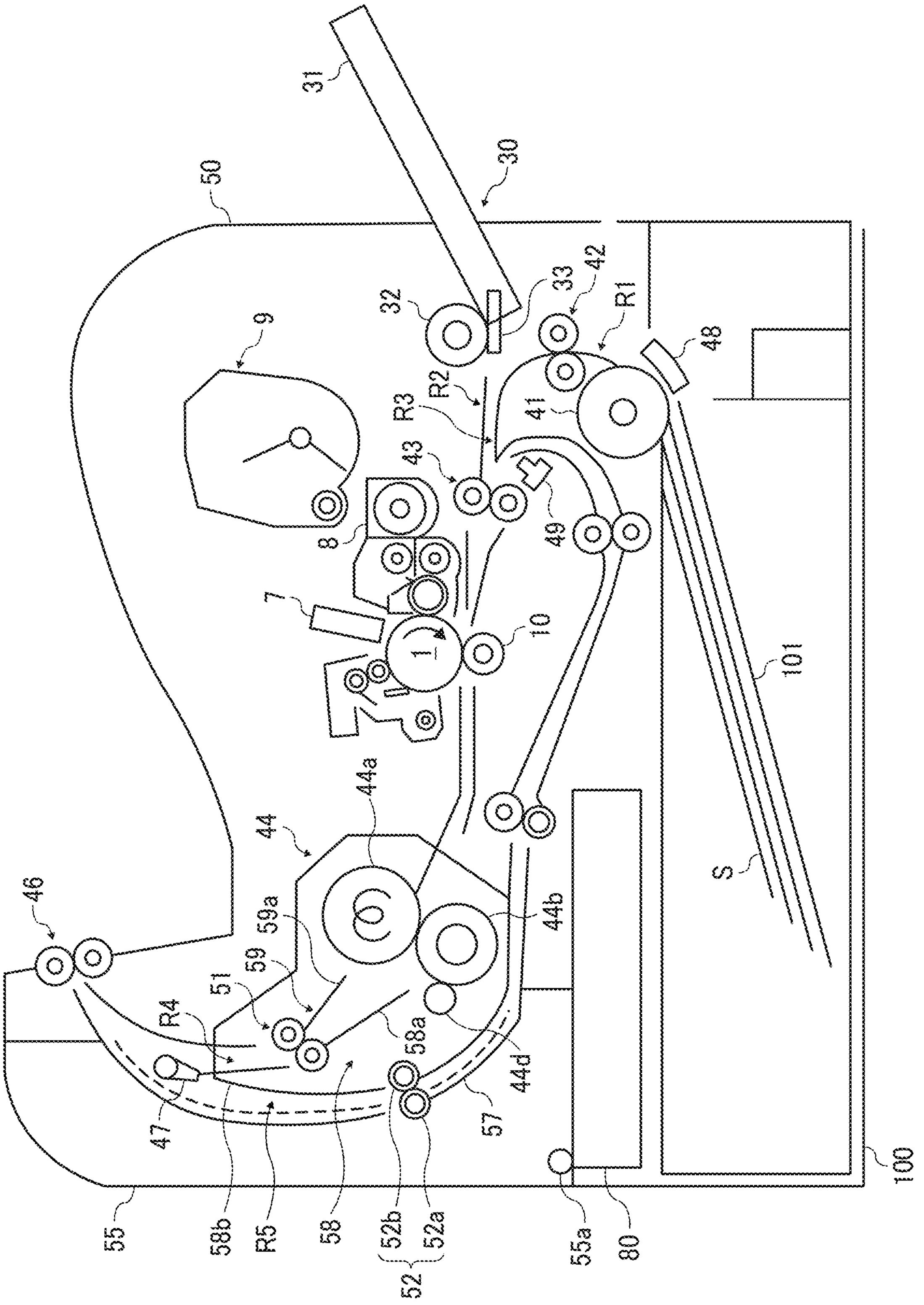
FIG. 1 is a schematic view of a printer serving as an image forming apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First Embodiment

Hereinafter, a description is given of an image forming apparatus including a developing device according to an embodiment of the present disclosure (hereinafter, the present embodiment is referred to as a "first embodiment"). First, a description is given of a basic configuration of a printer as an image forming apparatus according to the first embodiment. FIG. 1 is a schematic view of the printer as the image forming apparatus according to the first embodiment. In FIG. 1, the printer as the image forming apparatus includes, for example, a photoconductor 1 as a latent image bearer and a sheet tray 100. The sheet tray 100 is detachably attached to a body housing 50. The sheet tray 100 stores multiple recording sheets S in a form of a sheet bundle that includes a recording sheet S.

As a sheet feed roller 41 is driven to rotate, a recording sheet S is fed from the sheet tray 100. When a plurality of recording sheets S is fed from the sheet tray 100, an uppermost recording sheet S alone is separated from the other recording sheets S in a sheet separation nip region formed between the sheet feed roller 41 and a sheet separation pad 48 and is continuously conveyed downstream in a sheet conveyance direction in which the recording sheet S is conveyed. Then, the recording sheet S reaches a regular sheet conveyance passage R1 as a first sheet conveyance passage. Thereafter, the recording sheet S is gripped (held) in a sheet conveyance nip region formed by a relay roller pair 42 as an upper conveyance roller pair, and then the recording sheet S is conveyed from upstream to downstream in the sheet conveyance direction in the regular sheet conveyance passage R1.

The downstream end of the regular sheet conveyance passage R1 communicates with a common sheet conveyance passage R3. A registration roller pair 43 is disposed in the common sheet conveyance passage R3. A registration sensor 49 that detects the recording sheet S is disposed in the common sheet conveyance passage R3 and is disposed upstream from the registration roller pair 43 in the sheet conveyance direction. When the recording sheet S reaches the registration roller pair 43, the recording sheet S is temporarily stopped in a state where the leading end of the recording sheet S contacts the registration nip region of the registration roller pair 43 that is stopped. While the leading end of the recording sheet S contacts the registration roller pair 43, a skew of the recording sheet S is corrected. The registration sensor 49 is also used for an operation of checking a remaining recording sheet S in an initial operation and at the canceling of an abnormal stop of the printer.

The registration roller pair 43 starts rotating at a timing at which the recording sheet S can receive a toner image from the surface of the photoconductor 1 in the transfer nip region, to feed the recording sheet S toward the transfer nip region. At this time, the relay roller pair 42 starts rotating simultaneously with the start of rotations of the relay roller pair 42 to start conveyance of the recording sheet S that has been temporarily stopped.

The printer as the image forming apparatus according to the present embodiment includes a bypass sheet feeder 30 in the body housing 50. The bypass sheet feeder 30 as a bypass feeder includes a bypass sheet tray 31, a bypass sheet feed roller 32, a sheet separation pad 33, a bypass bottom plate 34, and a bypass bottom plate cam 35. The recording sheet S placed on the bypass sheet tray 31 of the bypass sheet feeder 30 is fed from the bypass sheet tray 31 along with the rotation of the bypass sheet feed roller 32 that functions as a sheet feed roller to feed the recording sheet S to a bypass sheet conveyance passage R2 that functions as a second sheet conveyance passage. The downstream end of the bypass sheet conveyance passage R2 and the downstream end of the regular sheet conveyance passage R1 meet with the common sheet conveyance passage R3. The recording sheet S fed by the bypass sheet feed roller 32 passes the sheet separation nip region formed by contact of the bypass sheet feed roller 32 and the sheet separation pad 33 in the bypass sheet conveyance passage R2. Then, the recording sheet S is conveyed to the common sheet conveyance passage R3 to be conveyed to the registration roller pair 43. Thereafter, similar to the recording sheet S fed from the sheet tray 100, the recording sheet S fed from the bypass sheet tray 31 passes the registration roller pair 43 to be conveyed to the transfer nip region.

Figure 2:
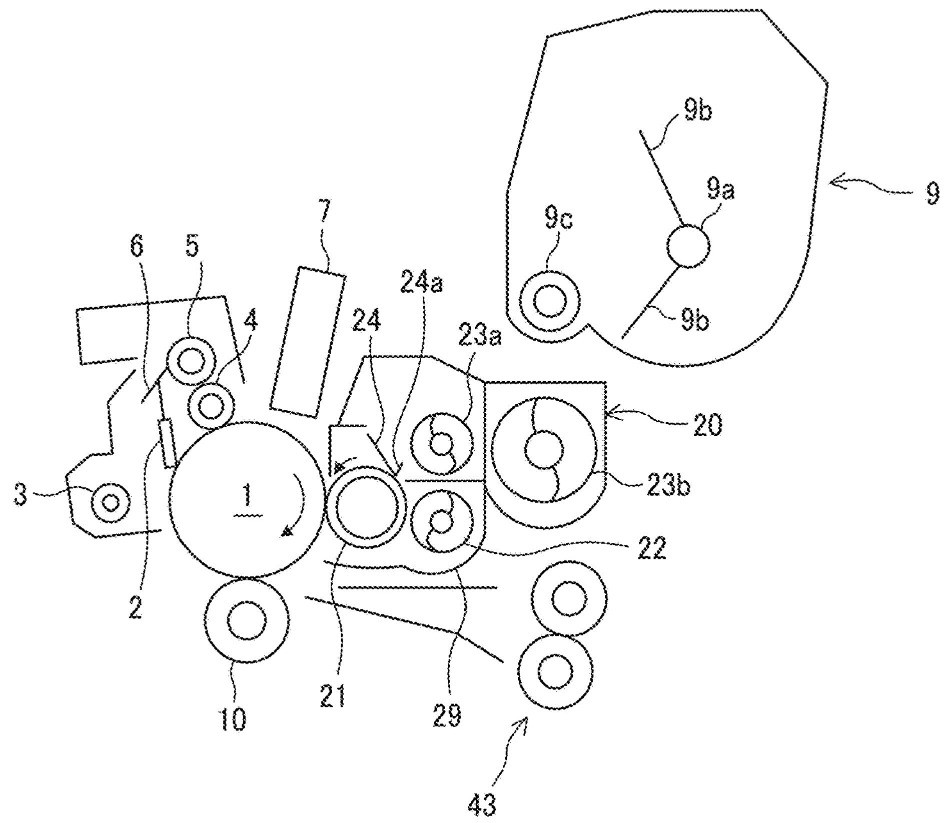
FIG. 2 is an enlarged view of a photoconductor and a configuration around the photoconductor in the printer of FIG. 1.

FIG. 2 is an enlarged view of the photoconductor 1 and a configuration around the photoconductor 1 in the printer. To be more specific, a cleaning blade 2, a toner collection screw 3, a charging roller 4, a charging-roller cleaning roller 5, a scraper 6, a latent-image writing device 7, a developing device 20, and a transfer roller 10 are disposed around the drum-shaped photoconductor 1 that is rotated in a clockwise direction in FIG. 2. The charging roller 4 includes a conductive rubber roller and forms a charging nip region with rotation while contacting the photoconductor 1. The charging roller 4 is applied with a charging bias that is output from a power supply for the charging roller 4. As a result, the surface of the photoconductor 1 is uniformly charged by the charging bias generated between the surface of the photoconductor 1 and the surface of the charging roller 4 in the charging nip region.

The latent-image writing device 7 includes a light-emitting diode (LED) array and performs light scanning with LED light over the surface of the photoconductor 1 that has been uniformly charged. When the latent-image writing device 7 emits laser light onto the uniformly charged surface of the photoconductor 1, the electric potential of the irradiated (exposed) region of the charged surface of the photoconductor 1 attenuates, so that an electrostatic latent image is formed on the surface of the photoconductor 1.

As the photoconductor 1 rotates, the electrostatic latent image passes through a development region formed between the surface of the photoconductor 1 and the developing device 20 when the photoconductor 1 is brought to face the developing device 20. The developing device 20 includes a developer circulation conveyance part and a developing part in a developing case 29. The developer circulation conveyance part includes toner as one component developer. The developer circulation conveyance part includes toner conveyors 23A and 23B that convey toner, and a toner supplying roller 22 that supplies the toner to a developing roller 21.

The developing roller 21 as a toner bearer is supplied with toner at a contact portion with the toner supplying roller 22. The toner supplied to the developing roller 21 is conveyed by the rotation of the developing roller 21, and the layer thickness of the toner is regulated when the toner passes through a region opposite a toner-layer regulating blade 24 as a layer-thickness regulating member disposed to be pressed against the surface of the developing roller 21. Thereafter, the toner is conveyed in a development region opposite the photoconductor 1 while sliding on the surface of the photoconductor 1.

A development bias having the same polarity as the toner and as a uniformly charged electric potential (i.e., a background electric potential) on the surface of the photoconductor 1 is applied to the developing roller 21. The absolute value of this development bias is greater than the absolute value of the electric potential of the latent image and is smaller than the absolute value of the background electric potential on the background surface of the photoconductor 1. For this reason, in the development region, a development potential acts between the electrostatic latent image formed on the photoconductor 1 and the developing roller 21 to electrostatically move the toner from the developing roller 21 toward the electrostatic latent image on the surface of the photoconductor 1. On the other hand, a background potential for electrostatically moving the toner from the photoconductor 1 to the developing roller 21 acts between the background portion of the photoconductor 1 and the developing roller 21. This action of the background potential causes the toner to selectively adhere to the electrostatic latent image formed on the surface of the photoconductor 1, and then the electrostatic latent image is developed in the development region.

A toner cartridge 9 is disposed above the developing device 20. The toner cartridge 9 stores toner inside and agitates the toner with agitators 9*b* fixed to a rotary shaft 9*a*. A toner supplying member 9*c* is driven to rotate in accordance with the replenishment operation signal output from a controller 80. With this operation, the amount of toner corresponding to the amount of rotational drive of the toner supplying member 9*c* is replenished in the developing case 29 of the developing device 20.

A toner image (an image) formed on the surface of the photoconductor 1 as a result of the development by the developing device 20 enters the transfer nip region where the photoconductor 1 and the transfer roller 10 contact each other along with rotation of the photoconductor 1. An electric voltage having the opposite polarity to the latent-image electric potential of the photoconductor 1 is applied to the transfer roller 10 to form a transfer bias in the transfer nip region.

As described above, the registration roller pair 43 feeds the recording sheet S toward the transfer nip region at a timing at which the toner image formed on the photoconductor 1 can be overlaid onto the sheet S in the transfer nip region. The toner image formed on the photoconductor 1 is transferred onto the recording sheet S, which closely contacts the toner image formed on the photoconductor 1, at the transfer nip region due to the transfer bias and the nip pressure.

Untransferred toner that has not been transferred onto the recording sheet S remains on the surface of the photoconductor 1 after the toner image has passed through the transfer nip region. After the untransferred toner is scraped off from the surface of the photoconductor 1 by the cleaning blade 2 that contacts the photoconductor 1, the untransferred toner is conveyed by the toner collection screw 3 toward a waste toner bottle.

The surface of the photoconductor 1 that has been cleaned by the cleaning blade 2 is electrically discharged by a charge eliminating unit. Then, the surface of the photoconductor 1 is uniformly charged again by the charging roller 4. Foreign materials such as toner additives and the toner that has not been removed by the cleaning blade 2 remain on the charging roller 4 that is in contact with the surface of the photoconductor 1. These foreign materials are transferred onto the charging-roller cleaning roller 5 that is in contact with the charging roller 4, and then are scraped off from the surface of the charging-roller cleaning roller 5 by the scraper 6 that is in contact with the charging-roller cleaning roller 5. The foreign materials scraped off from the surface of the charging-roller cleaning roller 5 fall onto the toner collection screw 3.

In FIG. 1, the recording sheet S, which has passed through the transfer nip region where the photoconductor 1 and the transfer roller 10 contact each other, is conveyed to a fixing device 44. The fixing device 44 includes a fixing roller 44*a* and a pressure roller 44*b*. The fixing roller 44*a* includes a heat generating source such as a halogen lamp. The pressure roller 44*b* is pressed against the fixing roller 44*a*. The fixing roller 44*a* and the pressure roller 44*b* contact each other to form a fixing nip region. The toner image is fixed to the surface of the recording sheet S that is held in the fixing nip region due to application of heat and pressure. Thereafter, the recording sheet S that has passed through the fixing device 44 passes through a sheet ejection passage R4. Then, the recording sheet S is nipped in a sheet ejection nip region formed by a sheet ejection roller pair 46.

The printer as the image forming apparatus can switch printing modes between a single-side printing mode for performing single-side printing and a duplex printing mode for performing duplex printing. In the single-side printing mode, the printer forms an image on one side of the recording sheet S. By contrast, in the duplex printing mode, the printer forms images on both sides of the recording sheet S. In the single-side printing mode or in a case where images are already formed on both sides of the recording sheet S in the duplex printing mode, the sheet ejection roller pair 46 continues rotating in a forward direction to eject the recording sheet S in the sheet ejection passage R4 out of the printer. After passing through the fixing device 44, the recording sheets S are stacked on a sheet stacker on the top face of the body housing 50 of the printer.

By contrast, when an image is formed on one side of the recording sheet S in the duplex printing mode, the sheet ejection roller pair 46 is rotated in the reverse direction at the timing at which the trailing end of the recording sheet S enters the sheet ejection nip region of the sheet ejection roller pair 46. At this time, a switching claw 47 (switching member) disposed near the downstream end of the sheet ejection passage R4 moves to block (close) the sheet ejection passage R4 and open an entrance of a reverse sheet conveyance passage R5 at the same time. As the recording sheet S starts reversing by the reverse rotation of the sheet ejection roller pair 46, the recording sheet S is conveyed to the reverse sheet conveyance passage R5. The downstream end of the reverse sheet conveyance passage R5 meets the common sheet conveyance passage R3 on the upstream side from the registration roller pair 43 in the sheet conveyance direction. After being conveyed in the reverse sheet conveyance passage R5, the recording sheet S is conveyed to the registration roller pair 43 in the common sheet conveyance passage R3 again. Then, after a toner image has been formed on the other side of the recording sheet S in the transfer nip region, the recording sheet S passes through the fixing device 44, the sheet ejection passage R4, and the sheet ejection roller pair 46 and is then ejected to the outside of the body housing 50 of the printer.

The fixing device 44 according to the first embodiment includes a cleaning roller 44*d* that removes adhered substances or foreign materials (such as toner and paper dust) adhered to the surface of the pressure roller 44*b*. The cleaning roller 44*d* contacts the pressure roller 44*b* or separates from the pressure roller 44*b* by a contact-and-separation mechanism.

Further, the fixing device 44 also includes a member including a portion from the fixing nip region of the sheet ejection passage R4 to the switching claw 47. Specifically, the fixing device 44 includes a sheet ejection guide 59, a sheet ejection reversal guide 58, and a relay conveyance roller pair 51. The sheet ejection guide 59 includes a guide portion 59*a* to face a contact surface of the recording sheet S that has contacted the fixing roller 44*a* in passing through the fixing nip region, and guide the recording sheet S to the switching claw 47. The sheet ejection reversal guide 58 includes a sheet ejection guide portion 58*a* and a sheet reversal guide portion 58*b*. The sheet ejection guide portion 58*a* is disposed to face a contact face of the recording sheet S that has contacted the pressure roller 44*b* in passing through the fixing nip region, and guide the recording sheet S to the switching claw 47. The sheet reversal guide portion 58*b* is disposed to face an image forming face of the recording sheet S having passed the switching claw 47 in the reverse sheet conveyance passage R5 to guide the recording sheet S. Further, a driven roller 52*b* of a sheet reversal conveyance roller pair 52 is also attached to the sheet ejection reversal guide 58 to convey the recording sheet S in the reverse sheet conveyance passage R5.

Further, the body housing 50 of the printer includes a cover 55 on the left side surface of the body housing 50 of the printer in FIG. 1. The cover 55 includes a sheet reversal guide 57 to face a non-image forming surface of the recording sheet S in the reverse sheet conveyance passage R5 to guide the recording sheet S. A drive roller 52*a* of the sheet reversal conveyance roller pair 52 is attached to the sheet reversal guide 57.

Figure 3:
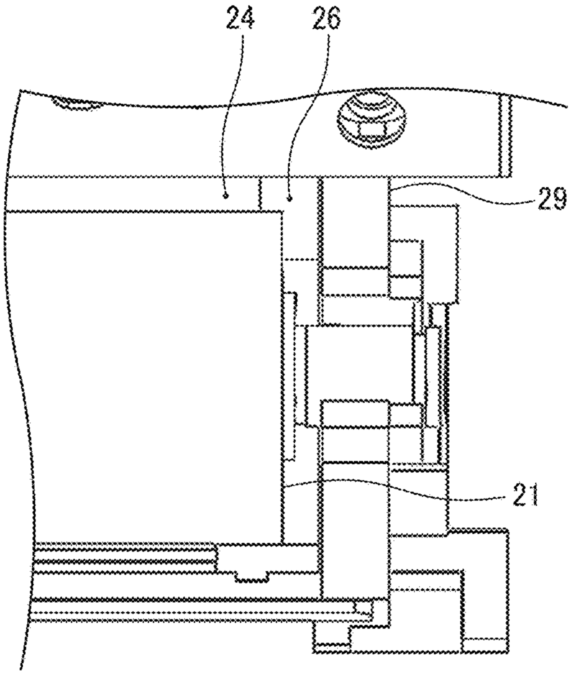
FIG. 3 is a front view of a vicinity of an axial end of a developing roller in a developing case of a developing device of the printer of FIG. 1.
Figure 4:
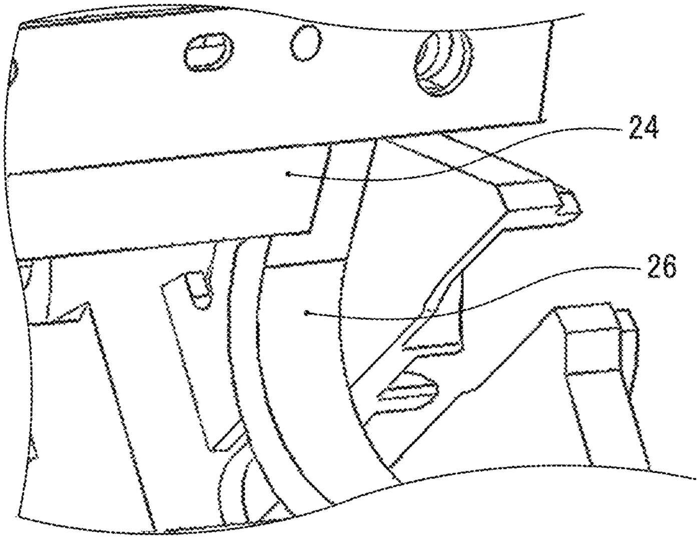
FIG. 4 is a perspective view of a vicinity of the axial end of the developing roller in a state where the developing roller is removed from the developing case of the developing device of FIG. 3.
Figure 5:
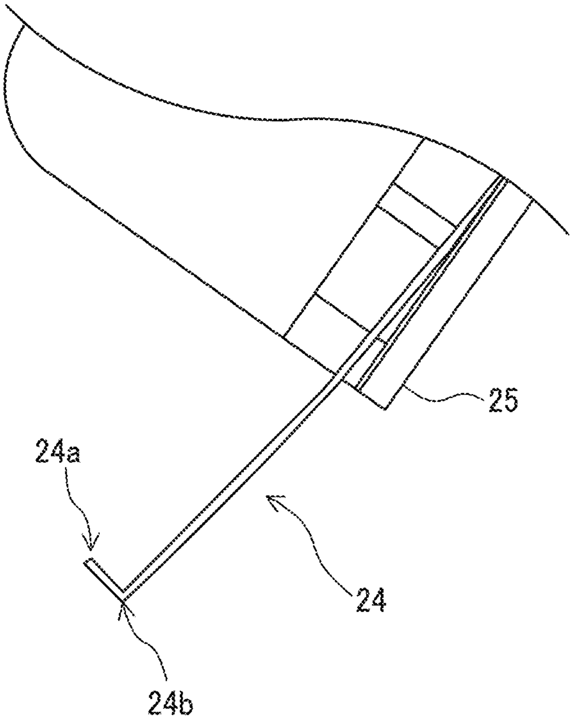
FIG. 5 is a side view of a toner-layer regulating blade of the developing device of FIG. 3 when viewed from an axial direction of the developing roller.
Figure 6:
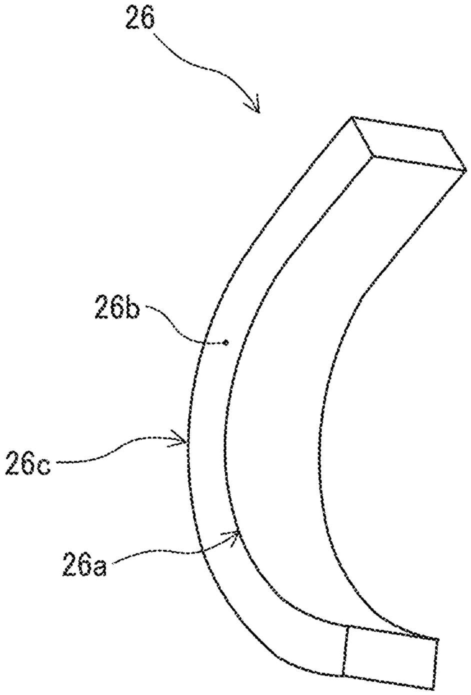
FIG. 6 is a perspective view of a seal of the developing device of FIG. 3 when viewed from a side opposite an end surface of the developing roller.

FIG. 3 is a front view of a vicinity of an end of the developing roller 21 in an axial direction of the developing roller 21, that is, an end in a width direction of the developing roller 21 (hereinafter, also simply referred to as "width direction") in the developing case 29 of the developing device 20 of the first embodiment. FIG. 4 is a perspective view of a vicinity of an end of the developing roller 21 in the axial direction in a state where the developing roller 21 is detached from the developing case 29 of the developing device 20 of the first embodiment. FIG. 5 is a side view of the toner-layer regulating blade 24 of the first embodiment when viewed from the axial direction of the developing roller 21 (the width direction of the developing roller 21). FIG. 6 is a perspective view of a seal 26 of the first embodiment when viewed from the side opposite an end surface 21*a* of the developing roller 21.

The toner-layer regulating blade 24 is a plate-shaped member made of, for example, a stainless alloy plate, and a root portion of the toner-layer regulating blade 24 is supported by a blade supporting portion 25 of the developing case 29. As illustrated in FIG. 5, the toner-layer regulating blade 24 of the first embodiment has a bent portion 24*a* (a projecting portion) formed by bending a tip portion of the toner-layer regulating blade 24 in a direction away from the developing roller 21.

The toner-layer regulating blade 24 is disposed to press the vicinity of the root portion (a regulating portion 24*b*) of the bent portion 24*a* against the surface (the circumferential surface) of the developing roller 21 by utilizing the resiliency of the toner-layer regulating blade 24 itself. The layer thickness of the toner on the surface of the developing roller 21 is regulated by the vicinity of the root portion (regulating portion 24*b*) of the bent portion 24*a* of the toner-layer regulating blade 24.

As illustrated in FIGS. 3 and 4, in the developing device 20, the seal 26 is disposed between the end surface 21*a* of the developing roller 21 and a seal holding surface 29*a* of the developing case 29 opposite the end surface 21*a* in order to prevent toner leakage in which toner in the developing case 29 leaks from the end of the developing roller 21 in the axial direction.

As illustrated in FIG. 6, the seal 26 has a structure in which a surface layer portion 26*a* that contacts the end surface 21*a* of the developing roller 21, an elastic portion 26*b*, and a double-sided tape 26*c* that is an adhesive layer are laminated. The surface layer portion 26*a* can be made of a member formed of fibers having, for example, a pile shape, a felt shape, or a brush shape, or a material having a low friction coefficient such as high molecular polyethylene. The elastic portion 26*b* can be formed of an elastic member such as sponge or urethane foam. The double-sided tape 26*c* is used to bond the seal 26 to the seal holding surface 29*a* of the developing case 29.

The seal 26 is held on the seal holding surface 29*a* by the double-sided tape 26*c* before the developing roller 21 is assembled. Thereafter, the developing roller 21 is assembled, and then the seal 26 is compressed to be crushed against the end surface 21*a* of the developing roller 21. Such a configuration closely contacts the end surface 21*a* of the developing roller 21 and the seal 26, so that toner leakage is prevented.

As illustrated in FIGS. 3 and 4, the end of the toner-layer regulating blade 24 in the width direction is disposed to extend to the end surface 21*a* of the developing roller 21 opposite the seal 26 in the width direction of the developing roller 21. Accordingly, the seal 26 is disposed such that the extending portion of the bent portion 24*a* of the toner-layer regulating blade 24 (an end of the bent portion 24*a* which is a part of the projecting portion placed at a position opposite the end surface 21*a* of the developing roller 21) is interposed between the seal and the end surface 21*a* of the developing roller 21. As a result, the seal 26 is crushed and deformed by the bent portion 24*a* of the toner-layer regulating blade 24.

Figure 7:
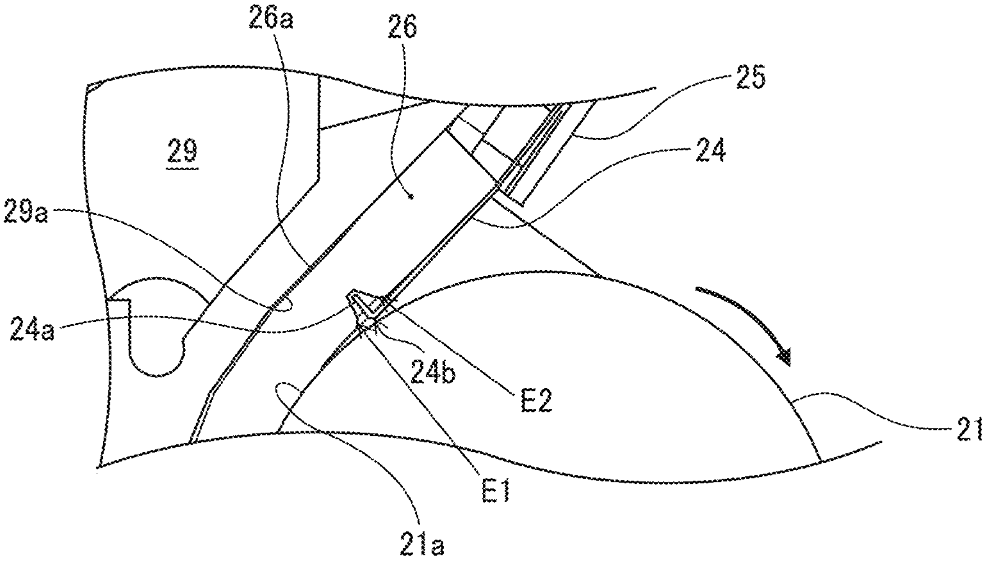
FIG. 7 is an enlarged cross-sectional view of an axial end of a developing roller and a toner-layer regulating blade in a developing device according to a comparative example, taken along a cross section orthogonal to an axis of the developing roller.

FIG. 7 is an enlarged cross-sectional view of an end of a developing roller 21 in an axial direction of the developing roller 21 (an end of the developing roller 21 in a width direction of the developing roller 21) and a toner-layer regulating blade 24 in a developing device according to a comparative example, taken along a cross section orthogonal to the axis of the developing roller 21. If the contact pressure between an end surface 21*a* of the developing roller 21 and a seal 26 is insufficient, the deformation of the seal 26 does not sufficiently follow the shape of a bent portion 24*a* of the toner-layer regulating blade 24. Accordingly, in the comparative example, as illustrated in FIG. 7, gaps E1 and E2 are formed between the seal 26 and each of an upstream adjacent portion and a downstream adjacent portion of the bent portion 24*a* of the toner-layer regulating blade 24 in the rotation direction (surface movement direction) of the developing roller 21. As a result, toner leakage may occur from the gaps E1 and E2 between the toner-layer regulating blade 24 and the seal 26.

On the other hand, when the seal 26 is deformed to the extent that the seal 26 can sufficiently follow the shape of the bent portion 24*a* of the toner-layer regulating blade 24, the seal 26 contacts the bent portion 24*a* of the toner-layer regulating blade 24 with a strong contact pressure in order to reduce or eliminate the gaps E1 and E2. Accordingly, the root portion (regulating portion 24*b*) of the bent portion 24*a* of the toner-layer regulating blade 24 contacts the end surface 21*a* of the developing roller 21 with an excessive contact pressure. As a result, various inconveniences may occur, such as an increase in the rotational drive torque of the developing roller 21, a temperature rise due to frictional heat generated at the contact portion between the toner-layer regulating blade 24 and the end surface 21*a* of the developing roller 21, and wear of the developing roller 21 due to sliding at the contact portion.

Figure 8:
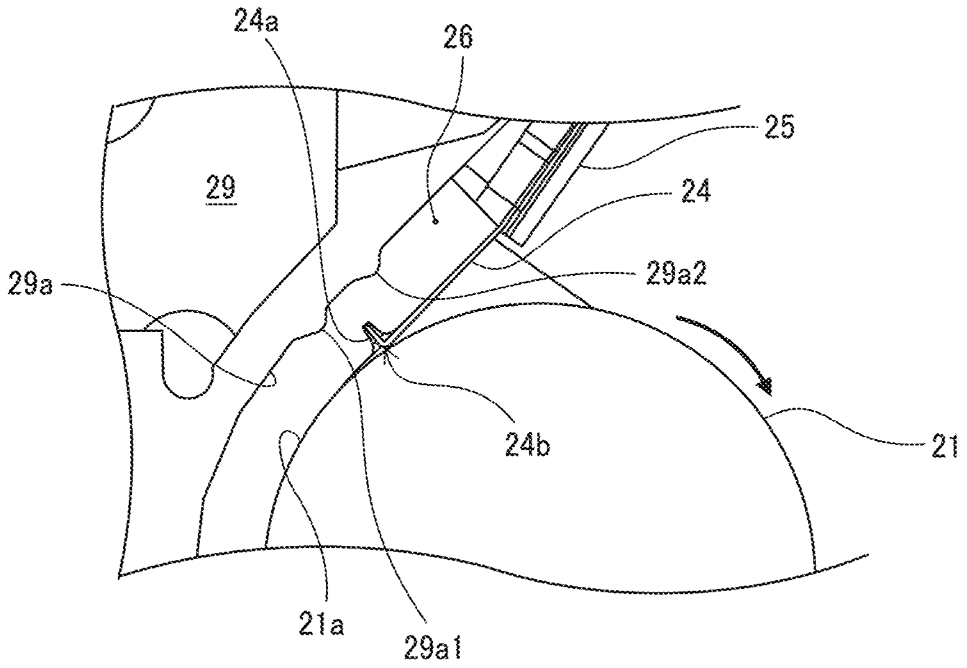
FIG. 8 is an enlarged cross-sectional view of an axial end of a developing roller and a toner-layer regulating blade in a developing device according to the first embodiment, taken along a cross section orthogonal to an axis of the developing roller.
Figure 9:
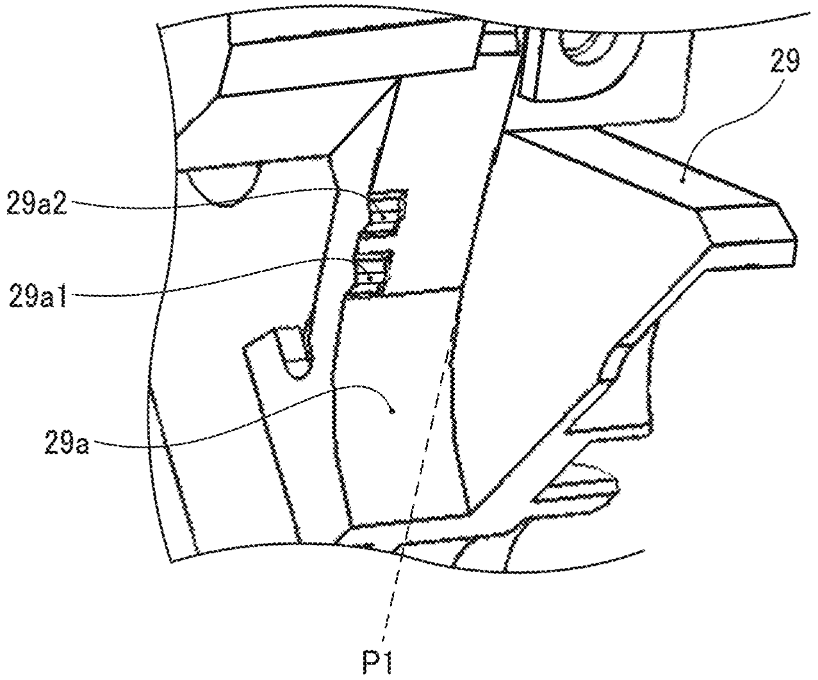
FIG. 9 is a partial perspective view of a vicinity of a seal holding surface of a developing case in the developing device of FIG. 8.
Figure 10:
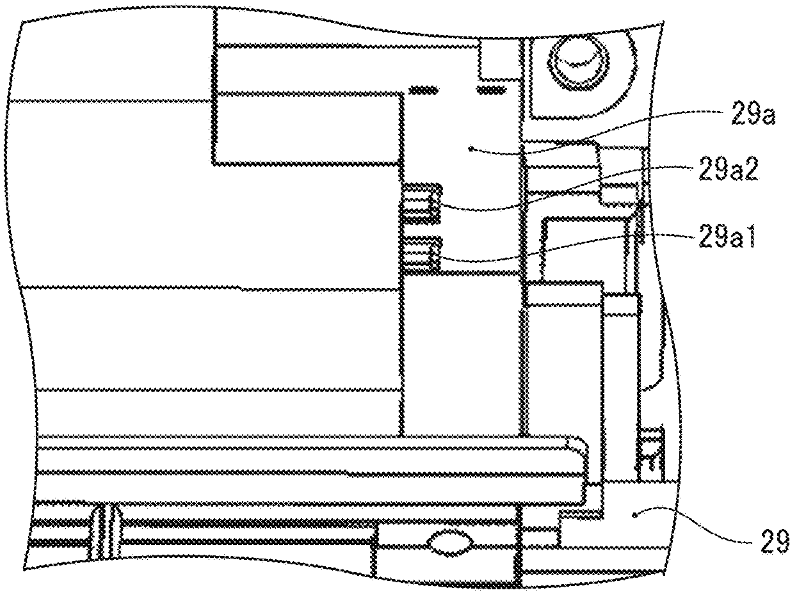
FIG. 10 is a partial front view of a vicinity of the seal holding surface of the developing case in the developing device of FIG. 8.
Figure 11:
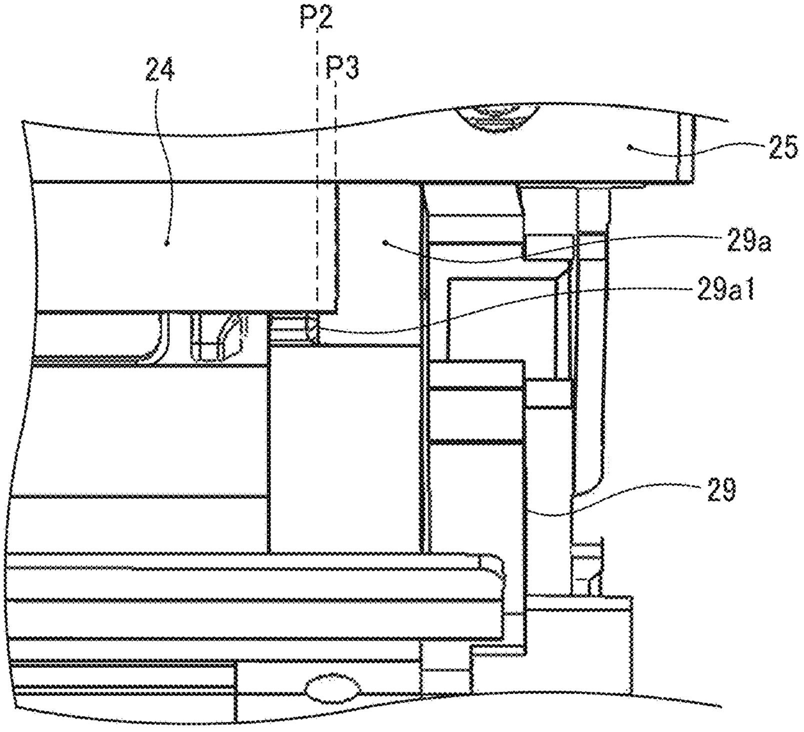
FIG. 11 is a partial front view of a vicinity of the seal holding surface of the developing case and a toner-layer regulating blade in the developing device of FIG. 8.

FIG. 8 is an enlarged cross-sectional view of an end of the developing roller 21 in the axial direction and the toner-layer regulating blade 24 in the developing device 20 according to the first embodiment, taken along a cross section orthogonal to the axis of the developing roller 21. FIG. 9 is a partial perspective view of a vicinity of the seal holding surface 29*a* of the developing case 29 in the developing device 20 according to the first embodiment. FIG. 10 is a partial front view of a vicinity of the seal holding surface 29*a* of the developing case 29 in the developing device 20 according to the first embodiment. FIG. 11 is a partial front view of a vicinity of the seal holding surface 29*a* of the developing case 29 and the toner-layer regulating blade 24 in the developing device 20 according to the first embodiment.

In the first embodiment, the seal holding surface 29*a* that holds the seal 26 at a position opposite the end surface 21*a* of the developing roller 21 has convex portions 29*a*1 and 29*a*2 at positions opposite the upstream adjacent portion and the downstream adjacent portion (hereinafter referred to as a "bent-portion adjacent portion") of the bent portion 24*a* of the toner-layer regulating blade 24 in the rotational direction of the developing roller 21. Such a configuration can push out the portion of the seal 26 opposite the bent-portion adjacent portion of the toner-layer regulating blade 24 toward the bent-portion adjacent portion by the convex portions 29*a*1 and 29*a*2 on the seal holding surface 29*a*.

As a result, even if the contact pressure between the root portion (regulating portion 24*b*) of the bent portion 24*a* of the toner-layer regulating blade 24 and the end surface 21*a* of the developing roller 21 is within an appropriate range (within a range in which the above-described inconveniences are prevented), the gaps E1 and E2 between the bent-portion adjacent portion of the toner-layer regulating blade 24 and the seal 26 can be lessened as compared with the developing device according to the comparative example illustrated in FIG. 7 or can be eliminated as illustrated in FIG. 8. Accordingly, according to the first embodiment, the adhesion property between the bent-portion adjacent portion of the toner-layer regulating blade 24 and the seal 26 is maintained while preventing the above-described inconveniences, and toner leakage can be prevented.

When the double-sided tape 26*c* is disposed on the entire region of the seal 26 on the side facing the seal holding surface 29*a*, the adhesion between the seal 26 and the seal holding surface 29*a* is strengthened. However, typically, the adhesive layer such as the double-sided tape 26*c* is less likely to be stretched and bent than the elastic portion 26*b* of the seal 26. Accordingly, it is difficult for the double-sided tape 26*c* to deform to follow the shape of the convex portions 29*a*1 and 29*a*2 on the seal holding surface 29*a*. As a result, it may be difficult to push out a portion of the seal 26 opposite the bent-portion adjacent portion of the toner-layer regulating blade 24 toward the bent-portion adjacent portion by the convex portions 29*a*1 and 29*a*2 on the seal holding surface 29*a*.

In such a case, the double-sided tape 26*c* is preferably disposed at a position other than a region opposite the convex portions 29*a*1 and 29*a*2 on the seal holding surface 29*a* and a region in the vicinity thereof. With such a configuration, when the portion of the seal 26 opposite the bent-portion adjacent portion of the toner-layer regulating blade 24 is pushed out toward the bent-portion adjacent portion by the convex portions 29*a*1 and 29*a*2, the double-sided tape 26*c* does not hinder the pushing operation, and the adhesion property between the bent-portion adjacent portion of the toner-layer regulating blade 24 and the seal 26 is easily maintained.

In the first embodiment, as illustrated in FIG. 9, a position P1 of the end of the seal holding surface 29*a* in the width direction is preferably located outside the convex portions 29*a*1 and 29*a*2 in the width direction of the developing roller 21. With such a configuration, the seal 26 and a portion of the seal holding surface 29*a* outside the convex portions 29*a*1 and 29*a*2 in the width direction of the developing roller 21 can be bonded together by the double-sided tape 26*c*. Accordingly, even when the double-sided tape 26*c* is disposed at the position other than the region opposite the convex portions 29*a*1 and 29*a*2 on the seal holding surface 29*a* and the region in the vicinity thereof, the seal holding surface 29*a* and the seal 26 can be bonded to each other by the double-sided tape 26*c* over the entire region in the rotation direction of the developing roller 21. As a result, the bonding property between the seal holding surface 29*a* and the seal 26 can be maintained.

As illustrated in FIG. 11, end positions P2 of the convex portions 29*a*1 and 29*a*2 on the outer side in the width direction of the developing roller 21 are preferably located on the inner side in the width direction of the developing roller 21 with respect to end positions P3 of the bent portion 24*a* of the toner-layer regulating blade 24. In this case, the convex portions 29*a*1 and 29*a*2 are not present between the end position P2 of each of the convex portions 29*a*1 and 29*a*2 and the end position P3 of the bent portion 24*a* in the width direction of the developing roller 21, and the gaps E1 and E2 having the same size as in the comparative example are formed between the bent-portion adjacent portion of the toner-layer regulating blade 24 and the seal 26. However, the adhesion property between the bent-portion adjacent portion of the toner-layer regulating blade 24 and the seal 26 is maintained by the convex portions 29*a*1 and 29*a*2 on the inner side of the developing roller 21 in the width direction (on the inner side of the developing case 29), so that toner leakage is prevented.

On the other hand, such a configuration can widen a portion of the seal holding surface 29*a* on the outer side of the developing roller 21 than the convex portions 29*a*1 and 29*a*2 in the width direction. Accordingly, even when the double-sided tape 26*c* is disposed at the position other than the region on the seal holding surface 29*a* opposite the convex portions 29*a*1 and 29*a*2 and the region in the vicinity thereof, the seal holding surface 29*a* and the seal 26 can be bonded to each other with the double-sided tape 26*c* in a wider bonding region. As a result, the bonding property between the seal holding surface 29*a* and the seal 26 can be maintained.

In the first embodiment, the convex portions 29*a*1 and 29*a*2 are disposed at positions opposite both of the upstream adjacent portion and the downstream adjacent portion of the bent portion 24*a* of the toner-layer regulating blade 24 in the rotation direction of the developing roller 21. However, the convex portion may be disposed at only one of the positions.

Second Embodiment

A description is given below of an image forming apparatus including a developing device 20 according to another embodiment of the present disclosure (hereinafter, referred to as "second embodiment"). In the following description, descriptions of points common with the first embodiment are omitted.

Figure 12:
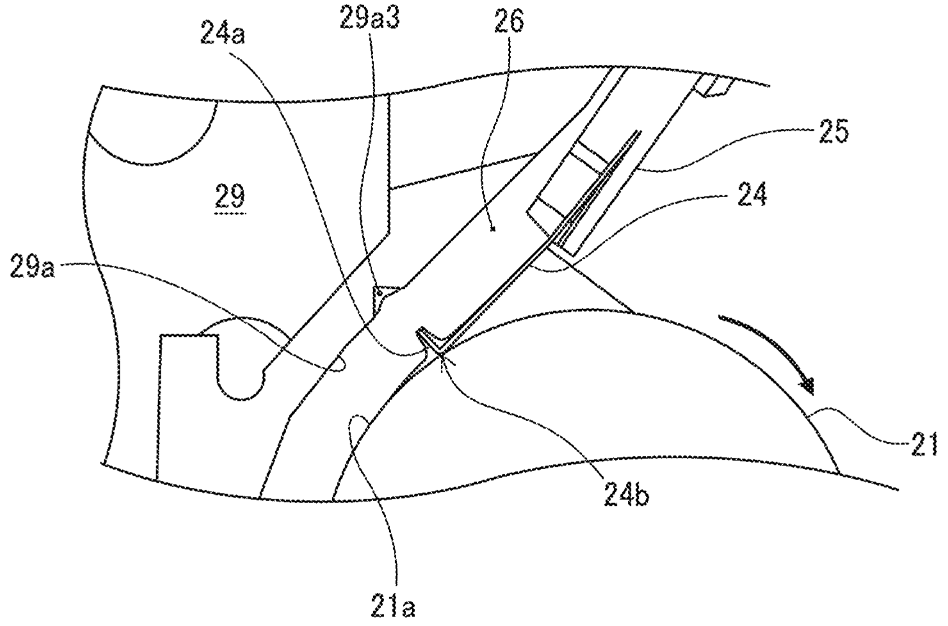
FIG. 12 is an enlarged cross-sectional view of an axial end of a developing roller and a toner-layer regulating blade in a developing device according to a second embodiment, taken along a cross section orthogonal to an axis of the developing roller.
Figure 13:
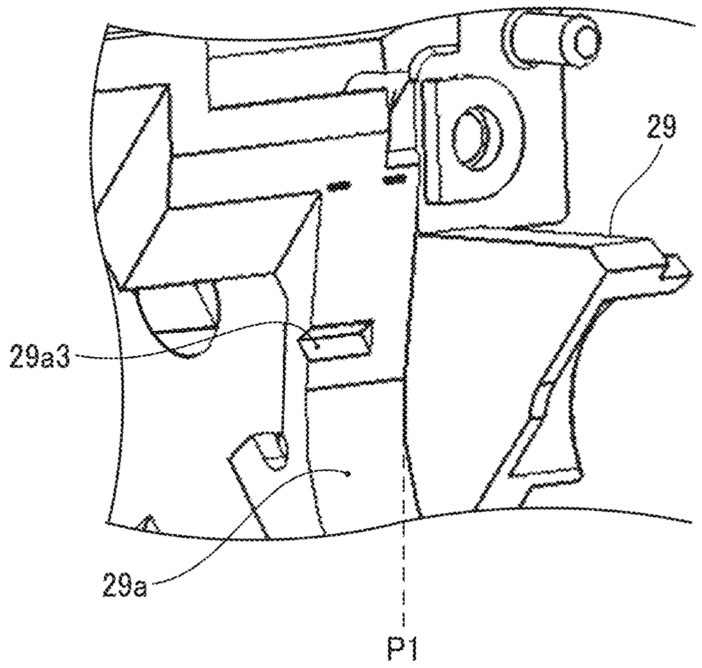
FIG. 13 is a partial perspective view of a vicinity of a seal holding surface of a developing case in the developing device of FIG. 12.

FIG. 12 is an enlarged cross-sectional view of an end of a developing roller 21 in an axial direction of the developing roller 21 and a toner-layer regulating blade 24 in the developing device 20 according to the second embodiment, taken along a section orthogonal to the axis of the developing roller 21. FIG. 13 is a partial perspective view of a vicinity of a seal holding surface 29*a* of a developing case 29 in the developing device 20 according to the second embodiment.

In the second embodiment, a recess 29*a*3 is disposed at a position opposite a bent portion 24*a* of the toner-layer regulating blade 24 in the seal holding surface 29*a* that holds the seal 26 at a position opposite the end surface 21*a* of the developing roller 21. With such a configuration, when the seal 26 is pushed (crushed) by the bent portion 24*a* of the toner-layer regulating blade 24, a portion of the seal 26 on the side opposite the bent portion 24*a* can escape into the recess 29*a*3 of the seal holding surface 29*a*. As a result, even when the seal 26 is pushed (crushed) by the bent portion 24*a* of the toner-layer regulating blade 24, the compression amount of the seal 26 can be reduced. Accordingly, the contact pressure at which the root portion (regulating portion 24*b*) of the bent portion 24*a* of the toner-layer regulating blade 24 contacts the end surface 21*a* of the developing roller 21 can be reduced.

In the second embodiment, as illustrated in FIG. 12, even if the seal 26 contacts against the bent portion 24*a* of the toner-layer regulating blade 24 with a strong contact pressure in order to reduce or eliminate the gaps E1 and E2 between the bent-portion adjacent portion of the toner-layer regulating blade 24 and the seal 26, the contact pressure between the root portion (regulating portion 24*b*) of the bent portion 24*a* of the toner-layer regulating blade 24 and the end surface 21*a* of the developing roller 21 can be kept within an appropriate range (within a range in which the above-described inconveniences are prevented). Accordingly, according to the second embodiment, it is possible to maintain the adhesion property between the bent-portion adjacent portion of the toner-layer regulating blade 24 and the seal 26 and prevent toner leakage while preventing the above-described inconveniences.

The configuration of the second embodiment in which the recess 29*a*3 is disposed may be combined with the configuration of the first embodiment in which the convex portions 29*a*1 and 29*a*2 are disposed. In this case, the shape and size of the recess 29*a*3, and the shapes and sizes of the convex portions 29*a*1 and 29*a*2 are appropriately adjusted, so that a configuration in which the adhesion property between the bent-portion adjacent portion of the toner-layer regulating blade 24 and the seal 26 can be maintained can be achieved while preventing the above-described inconveniences.

In the first embodiment and the second embodiment, the projecting portion formed on the back side of the regulating portion 24*b* (the portion that regulates the layer thickness of the toner on the surface of the developing roller 21) of the toner-layer regulating blade 24 is formed by the bent portion 24*a* formed by bending the tip portion of the plate-shaped member. However, the configuration of the toner-layer regulating blade 24 is not limited to this example as long as the projecting portion is placed on the back side of the regulating portion 24*b* of the toner-layer regulating blade 24. For example, a configuration in which a step is disposed on the back side of the regulating portion 24*b* of the toner-layer regulating blade 24 (a configuration in which the thickness of the back side of the regulating portion 24*b* of the toner-layer regulating blade 24 is thick) may be adopted.

When the double-sided tape 26*c* is disposed on the entire region of the seal 26 on the side facing the seal holding surface 29*a*, the adhesion between the seal 26 and the seal holding surface 29*a* is strengthened. However, deforming the portion of the seal 26 opposite the bent portion 24*a* of the toner-layer regulating blade 24 toward the recess 29*a*3 on the seal holding surface 29*a* may be difficult.

In such a case, the double-sided tape 26*c* is preferably disposed at a position other than a region opposite the recess 29*a*3 on the seal holding surface 29*a* and a region in the vicinity thereof. Such a configuration can prevent the double-sided tape 26*c* from interrupting when the portion of the seal 26 opposite the bent portion 24*a* of the toner-layer regulating blade 24 is deformed toward the recess 29*a*3, and can appropriately reduce the contact pressure when the root portion (regulating portion 24*b*) of the bent portion 24*a* of the toner-layer regulating blade 24 contacts the end surface 21*a* of the developing roller 21.

In the second embodiment, the position P1 of the end of the seal holding surface 29*a* in the width direction is preferably located outside the recess 29*a*3 of the developing roller 21 in the width direction as illustrated in FIG. 13. With this configuration, the portion of the seal holding surface 29*a* outside the recess 29*a*3 in the width direction of the developing roller can be bonded to the seal 26 by the double-sided tape 26*c*. Accordingly, even when the double-sided tape 26*c* is disposed at the position other than the region opposite the recess 29*a*3 on the seal holding surface 29*a* and the region in the vicinity thereof, the seal holding surface 29*a* and the seal 26 can be bonded to each other by the double-sided tape 26*c* over the entire region in the rotational direction of the developing roller 21. As a result, the bonding property between the seal holding surface 29*a* and the seal 26 can be maintained.

Figure 14:
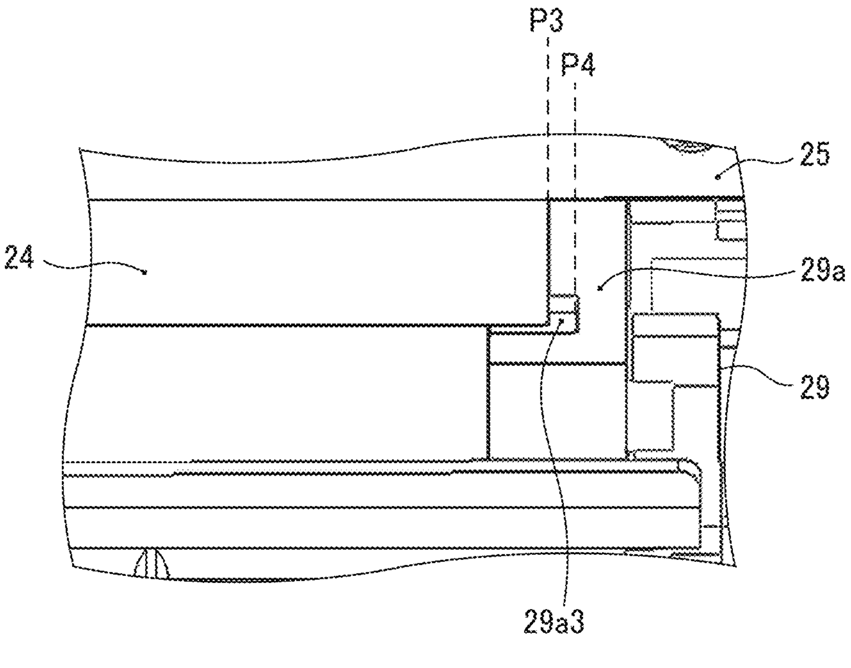
FIG. 14 is a partial front view of a vicinity of the axial end of the developing roller in a state where the developing roller is removed from the developing case of the developing device of FIG. 12.

At the edge portion of the toner-layer regulating blade 24 (the end of the toner-layer regulating blade 24 in the width direction of the developing roller 21), the contact pressure between the toner-layer regulating blade 24 and the developing roller 21 is likely to be high, so that an excessive contact pressure is likely to be generated. Accordingly, as illustrated in FIG. 14, an end position P4 of the recess 29*a*3 on the outer side in the width direction of the developing roller 21 is preferably located on the outer side in the width direction of the developing roller with respect to an end position P3 of the bent portion 24*a* of the toner-layer regulating blade 24. In this case, the recess 29*a*3 is disposed up to a position opposite the end of the bent portion 24*a* of the toner-layer regulating blade 24 in the width direction of the developing roller 21. As a result, the contact pressure between the edge portion of the toner-layer regulating blade 24 (the end of the toner-layer regulating blade 24 in the width direction of the developing roller 21) and the developing roller 21 can be released by the recess 29*a*3, and thus the occurrence of the excessive contact pressure can be prevented.

The configurations according to the above-descried embodiments are examples, and embodiments of the present disclosure are not limited to the above. For example, the following aspects can achieve specific effects described below.

First Aspect

A developing device (e.g., the developing device 20) includes a toner bearer (e.g., the developing roller 21), a layer-thickness regulating member (e.g., the toner-layer regulating blade 24), and a seal (e.g., the seal 26). The layer-thickness regulating member regulates layer thickness of toner on the toner bearer at a regulating portion (e.g., the regulating portion 24*b*) pressed against the surface of the toner bearer. The seal is disposed between an end surface (e.g., the end surface 21*a*) of the toner bearer and a seal holding surface (e.g., the seal holding surface 29*a*) opposite the end surface of the toner bearer. The layer-thickness regulating member includes a projecting portion (e.g., the bent portion 24*a*) at a back side of the regulating portion. The seal is disposed such that a part of the projecting portion located at a position opposite the end surface of the toner bearer is interposed between the seal and the end surface of the toner bearer. The seal holding surface has a convex portion (e.g., the convex portions 29*a*1 and 29*a*2) at a position opposite at least one of an upstream adjacent portion and a downstream adjacent portion adjacent to the part of the projecting portion in the surface movement direction of the toner bearer.

The part of the projecting portion of the layer-thickness regulating member disposed at a position opposite the end surface of the toner bearer crushes the seal, and the seal is deformed following the shape of the part of the projecting portion, so that the adhesion property between the layer-thickness regulating member and the seal in the vicinity of the part of the projecting portion is maintained. However, when the seal is deformed to follow the shape of the part of the projecting portion in order to maintain the adhesion property, the seal is preferably contacted against the part of the projecting portion of the layer-thickness regulating member with a strong contact pressure. Accordingly, the contact pressure between the layer-thickness regulating member and the surface of the toner bearer at the part of the projecting portion becomes excessive, so that various inconveniences such as an increase in torque of the surface movement of the toner bearer, a temperature rise due to frictional heat at the contact portion, and abrasion of the toner bearer due to sliding at the contact portion may occur. On the other hand, when the contact pressure between the layer-thickness regulating member and the surface of the toner bearer at the part of the projecting portion is within an appropriate range, the contact pressure between the seal and the part of the projecting portion of the layer-thickness regulating member is too small to achieve the deformation of the seal to follow the shape of the part of the projecting portion of the layer-thickness regulating member. As a result, a gap is formed between the seal and the portion of the layer-thickness regulating member adjacent to the part of the projecting portion, so that the adhesion property between the seal and the layer-thickness regulating member in the vicinity of the part of the projecting portion becomes insufficient. Accordingly, maintaining the adhesion property between the seal and the layer-thickness regulating member in the vicinity of the part of the projecting portion while preventing the above-described inconveniences is difficult.

In the present aspect, the seal holding surface that holds the seal at a position opposite the end surface of the toner bearer has a convex portion at a position opposite at least one of an upstream adjacent portion and a downstream adjacent portion (projecting-portion adjacent portions) adjacent to the part of the projecting portion of the layer-thickness regulating member in the surface movement direction of the toner bearer. With such a configuration, the convex portion on the seal holding surface can push the portion of the seal opposite the at least one adjacent portion toward the projecting-portion adjacent portion. As a result, even when the contact pressure between the layer-thickness regulating member and the surface of the toner bearer at the part of the projecting portion is within an appropriate range (within a range in which the above-described inconveniences are prevented), the gap between the seal and the projecting-portion adjacent portion of the layer-thickness regulating member can be reduced or eliminated. Accordingly, according to the present aspect, the adhesion property between the seal and the layer-thickness regulating member in the vicinity of the part of the projecting portion can be maintained while preventing the above-described inconveniences.

Second Aspect

In the developing device (e.g., the developing device 20) according to the first aspect, an end position (e.g., the end position P1) on an outside of the seal holding surface (e.g., the seal holding surface 29*a*) in a width direction of the toner bearer (e.g., the developing roller 21) is located on the outer side than the convex portion (e.g., the convex portion 29*a*1, 29*a*2) in the width direction of the toner bearer.

With such a configuration, the seal (e.g., the seal 26) and a portion of the seal holding surface on the outer side in the width direction of the toner bearer can be bonded to each other. As a result, for example, even when the seal holding surface and the seal are bonded to each other while avoiding a region opposite the convex portion on the seal holding surface and a region in the vicinity thereof, the seal holding surface and the seal can be bonded to each other over the entire region in the movement direction of the surface of the toner bearer. Thus, the bonding property between the seal holding surface and the seal can be maintained.

Third Aspect

In the developing device (e.g., the developing device 20) according to the first or second aspect, an end position (e.g., the end position P2) on an outside of the convex portion (e.g., the convex portion 29*a*1, 29*a*2) in the width direction of the toner bearer (e.g., the developing roller 21) is located on an inner side than the part of the projecting portion (e.g., the bent portion 24*a*) in the width direction of the toner bearer.

Such a configuration can widely maintain a portion of the seal holding surface (e.g., the seal holding surface 29*a*) on the outer side in the width direction of the toner bearer with respect to the convex portion (e.g., the convex portion 29*a*1, 29*a*2). Accordingly, for example, even when the seal holding surface and the seal are bonded to each other while avoiding the region opposite the convex portion on the seal holding surface and the region in the vicinity thereof, the seal holding surface and the seal can be bonded to each other with a wider bonding area, and the bonding property between the seal holding surface and the seal can be maintained.

Fourth Aspect

In the developing device (e.g., the developing device 20) according to any one of the first to third aspects, the seal holding surface (e.g., the seal holding surface 29*a*) has a recess (e.g., the recess 29*a*3) at a position opposite the part of the projecting portion (e.g., the bent portion 24*a*).

With such a configuration, when the seal (e.g., the seal 26) is pushed (crushed) by the part of the projecting portion of the layer-thickness regulating member (e.g., the toner-layer regulating blade 24), a portion of the seal opposite the part of the projecting portion can escape into a recess (e.g., the recess 29*a*3) of the seal holding surface. As a result, even when the seal is pressed (crushed) by the part of the projecting portion of the layer-thickness regulating member, the compression amount of the seal can be restricted to be small, and the contact pressure between the layer-thickness regulating member and the surface of the toner bearer (e.g., the developing roller 21) at the part of the projecting portion can be reduced. Accordingly, even if the seal is contacted against the part of the projecting portion of the layer-thickness regulating member with a strong contact pressure in order to reduce or eliminate the gaps (e.g., the gaps E1 and E2) between the projecting-portion adjacent portion of the layer-thickness regulating member and the seal, the contact pressure between the layer-thickness regulating member and the surface of the toner bearer at the part of the projecting portion can be kept within an appropriate range (within a range in which the above-described inconveniences are prevented). As a result, in combination with the effect of the convex portions (e.g., the convex portion 29*a*1, 29*a*2) on the seal holding surface (the effect of reducing or eliminating the gap between the projecting-portion adjacent portion of the layer-thickness regulating member and the seal by the convex portion), the effect of maintaining the adhesion property between the layer-thickness regulating member and the seal in the vicinity of the part of the projecting portion can be more appropriately obtained while preventing the above-described inconveniences.

Fifth Aspect

A developing device (e.g., the developing device 20) includes a toner bearer (e.g., the developing roller 21), a layer-thickness regulating member (e.g., the toner-layer regulating blade 24), and a seal (e.g., the seal 26). The layer-thickness regulating member regulates layer thickness of toner on the toner bearer at a regulating portion (e.g., the regulating portion 24*b*) pressed against the surface of the toner bearer. The seal is disposed between an end surface (e.g., the end surface 21*a*) of the toner bearer and a seal holding surface (e.g., the seal holding surface 29*a*) opposite the end surface of the toner bearer. The layer-thickness regulating member includes a projecting portion (e.g., the bent portion 24*a*) at a back side of the regulating portion. The seal is disposed such that a part of the projecting portion located at a position opposite the end surface of the toner bearer is interposed between the seal and the end surface. The seal holding surface has a recess (e.g., the recess 29*a*3) at a position opposite the part of the projecting portion.

According to the fifth aspect, when the seal is pressed (crushed) by the part of the projecting portion (e.g., the bent portion 24*a*) of the layer-thickness regulating member, a portion of the seal on the opposite side of the part of the projecting portion can escape into the recess of the seal holding surface. As a result, even when the seal is pressed (crushed) by the part of the projecting portion of the layer-thickness regulating member, the compression amount of the seal can be restricted to be small, and the contact pressure between the layer-thickness regulating member and the surface of the toner bearer (e.g., the developing roller 21) at the part of the projecting portion can be reduced. Accordingly, even if the seal is contacted against the part of the projecting portion of the layer-thickness regulating member with a strong contact pressure in order to reduce or eliminate the gap (e.g., the gaps E1 and E2) between the projecting-portion adjacent portion of the layer-thickness regulating member and the seal, the contact pressure between the layer-thickness regulating member and the surface of the toner bearer at the part of the projecting portion can be kept within an appropriate range (within a range in which the above-described inconveniences are prevented). As a result, the adhesion property between the layer-thickness regulating member and the seal in the vicinity of the part of the projecting portion can be maintained while preventing the above-described inconveniences.

Sixth Aspect

In the developing device (e.g., the developing device 20) according to the fourth or fifth aspect, an end position (e.g., the end position P1) on the outside of the seal holding surface (e.g., the seal holding surface 29*a*) in a width direction of the toner bearer (e.g., the developing roller 21) is located on the outer side than the recess (e.g., the recess 29*a*3) in the width direction of the toner bearer. With such a configuration, the seal holding surface on the outer side of the recess in the width direction of the toner bearer and the seal (e.g., the seal 26) can be bonded to each other. As a result, for example, even when the seal holding surface and the seal are bonded to each other while avoiding the region opposite the recess on the seal holding surface and the region in the vicinity thereof, the seal holding surface and the seal can be bonded to each other over the entire region in the surface movement direction of the toner bearer, and thus the bonding property between the seal holding surface and the seal can be maintained.

Seventh Aspect

In the developing device (e.g., the developing device 20) according to any one of the fourth to sixth aspects, an end position (e.g., the end position P4) on an outside of the recess (e.g., the recess 29*a*3) in the width direction of the toner bearer (e.g., the developing roller 21) is located on the outer side than the part of the projecting portion in the width direction of the toner bearer. With such a configuration, the recess is not located up to the position opposite an end in the width direction of the toner bearer of the part of the projecting portion of the layer-thickness regulating member (e.g., the toner-layer regulating blade 24). The recess can release the contact pressure between the edge portion of the layer-thickness regulating member (the end of the layer-thickness regulating member in the width direction of the toner bearer) and the end surface of the toner bearer and can prevent the occurrence of the excessive contact pressure at the edge portion.

Eighth Aspect

In the developing device (e.g., the developing device 20) according to any one of the first to seventh aspects, the seal (e.g., the seal 26) is held on the seal holding surface (e.g., the seal holding surface 29*a*) by an adhesive layer (e.g., the double-sided tape 26*c*). The adhesive layer is not disposed at a position opposite the part of the projecting portion and positions opposite the upstream adjacent portion and the downstream adjacent portion adjacent to the part of the projecting portion in the surface movement direction of the toner bearer (e.g., the developing roller 21). Even when the adhesive layer is less likely to be deformed (for example, less likely to be stretched or bent) than the seal, such a configuration can appropriately obtain the effect of maintaining the adhesion property between the layer-thickness regulating member and the seal in the vicinity of the part of the projecting portion without being interrupted by the adhesive layer while reducing the above-described inconveniences.

Ninth Aspect

An image forming apparatus (e.g., the printer) including the developing device (e.g., the developing device 20) that develops a latent image on a latent image bearer (e.g., the photoconductor 1) with toner, according to any one of the first to eighth aspects is used as a developing device. Such a configuration can provide an image forming apparatus that can maintain the adhesion property between the layer-thickness regulating member (e.g., the toner-layer regulating blade 24) and the seal (e.g., the seal 26) in the vicinity of the part of the projecting portion while reducing the above-described inconveniences.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A developing device comprising:
a toner bearer;
a layer-thickness regulating member including:
a regulating portion to press against a surface of the toner bearer to regulate a layer thickness of toner on the toner bearer; and
a projecting portion at a back side of the regulating portion:
a seal holding surface opposite an end surface of the toner bearer; and
a seal between the end surface of the toner bearer and the seal holding surface,
wherein a part of the projecting portion opposite the end surface of the toner bearer is interposed between the seal and the end surface of the toner bearer,
wherein the seal holding surface has a convex portion at a position opposite at least one of an upstream adjacent portion or a downstream adjacent portion adjacent to the part of the projecting portion in a surface movement direction of the toner bearer,
wherein the seal has an adhesive layer holding the seal on the seal holding surface, and
wherein the adhesive layer is disposed in an area of the seal other than a position opposite the part of the projecting portion and positions opposite the upstream adjacent portion and the downstream adjacent portion adjacent to the part of the projecting portion in the surface movement direction of the toner bearer.

2. The developing device according to claim 1,
wherein an outer end of the seal holding surface in an axial direction of the toner bearer is located outer than the convex portion in the axial direction of the toner bearer.

3. The developing device according to claim 1,
wherein an outer end of the convex portion in an axial direction of the toner bearer is located inner than the part of the projecting portion in the axial direction of the toner bearer.

4. The developing device according to claim 1,
wherein the seal holding surface has a recess at a position opposite the part of the projecting portion.

5. An image forming apparatus comprising:
a latent image bearer; and
the developing device according to claim 1 to develop a latent image on the latent image bearer by using the toner.

6. A developing device comprising:
a toner bearer;
a layer-thickness regulating member including;
a regulating portion to press against a surface of the toner bearer to regulate a layer thickness of toner on the toner bearer; and
a projecting portion at a back side of the regulating portion;
a seal holding surface opposite an end surface of the toner bearer; and
a seal between the end surface of the toner bearer and the seal holding surface,
wherein a part of the projecting portion opposite the end surface of the toner bearer is interposed between the seal and the end surface of the toner bearer,
wherein the seal holding surface has a recess at a position opposite the part of the projecting portion,
wherein the seal has an adhesive layer holding the seal on the seal holding surface, and
wherein the adhesive layer is disposed in an area of the seal other than a position opposite the part of the projecting portion and positions opposite an upstream adjacent portion and a downstream adjacent portion adjacent to the part of the projecting portion in a surface movement direction of the toner bearer.

7. An image forming apparatus comprising:
a latent image bearer; and
the developing device according to claim 6 to develop a latent image on the latent image bearer by using the toner.

8. The developing device according to claim 6,
wherein an outer end of the seal holding surface in an axial direction of the toner bearer is located outer than the recess in the axial direction of the toner bearer.

9. The developing device according to claim 6,
wherein an outer end of the recess in an axial direction of the toner bearer is located outer than the part of the projecting portion in the axial direction of the toner bearer.

* * * * *